(12) United States Patent
Aoyama

(10) Patent No.: US 6,416,894 B1
(45) Date of Patent: Jul. 9, 2002

(54) HYDROGEN GENERATOR WITH FUEL CELL AND CONTROL METHOD FOR THE SAME

(75) Inventor: Satoshi Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/399,741

(22) Filed: Sep. 20, 1999

(30) Foreign Application Priority Data

Oct. 13, 1998 (JP) .............................. 10-291208

(51) Int. Cl.[7] ................................. H01M 8/04

(52) U.S. Cl. ........................... 429/20; 429/17

(58) Field of Search ............................. 429/17, 20, 19

(56) References Cited

U.S. PATENT DOCUMENTS 5,658,681 A 8/1997 Sato et al.

FOREIGN PATENT DOCUMENTS

| JP | A-60-49569 | 3/1985 |
| JP | A-3-159071 | 7/1991 |
| JP | A-6-181065 | 6/1994 |
| JP | A-6-231790 | 8/1994 |
| JP | A-10-182103 | 7/1998 |

*Primary Examiner*—John S. Maples
(74) *Attorney, Agent, or Firm*—Oliff & Berridge PLC

(57) ABSTRACT

A hydrogen generator is connected to a fuel cell installed in a vehicle as a driving power source. The hydrogen generator can produce an amount of vapor by a vaporizer that is more than a required vapor amount which produces an amount of hydrogen required to generate a certain power for driving the vehicle. Accordingly, a sufficient amount of energy can be readily supplied to the vehicle.

20 Claims, 4 Drawing Sheets

HYDROGEN GENERATOR WITH FUEL CELL AND CONTROL METHOD FOR THE SAME

INCORPORATION BY REFERENCE

The disclosure of Japanese Patent Application No. HEI 10-291298 filed on Oct. 13, 1998 including the specification, drawings and abstract is incorporated herein by reference in its entirety.

BACKGROUND OF THE INVENTION

1. Field of Invention

This invention relates to a hydrogen generator and to a control method for the generator, which can be connected to fuel cells installed in a vehicle as a driving power source.

2. Description of Related Art

For example, fuel cells are known as devices for converting energy released in a chemical reaction directly into electrical energy. A typical fuel cell has a pair of electrodes that are disposed so as to sandwich an electrolyte member therebetween. An electrochemical reaction occurs when a hydrogen-containing reaction gas contacts a surface of one of the electrodes in the pair of electrodes in an individual fuel cell and an oxygen-containing gas (e.g., air) contacts a surface of the other electrode. By utilizing this electrochemical reaction, fuel cells generate electrical energy.

Hydrogen gas introduced into the individual fuel cell can be supplied from a hydrogen tank. Also, hydrogen can be produced by a reforming apparatus. For example, hydrocarbon raw material, such as methanol or methane, is introduced into the reforming apparatus to produce hydrogen-rich gas, in which the main component of the gas is hydrogen and the rest of the gas is a mixture of carbon monoxide, carbon dioxide, etc. For example, when producing hydrogen-rich gas from methanol, a mixture of methanol and water is evaporated in a vaporizer of the reforming apparatus, and then the vapor of the mixture is reformed into hydrogen-rich gas by a catalyst in the apparatus. After reforming, carbon monoxide contained in the hydrogen-rich gas, which is an undesirable substance for fuel cells, is oxidized into carbon dioxide. Thus, the hydrogen-rich gas in which the carbon monoxide concentration has been reduced is introduced into fuel cells.

A fuel cell system in which external heat is utilized for reforming is disclosed in Japanese Laid-Open Patent Application No. HEI 06-181065, for example. In this system, it is possible to utilize surplus vapor, which is waste heat from a boiler of a thermal power station, to vaporize the raw material, so that energy for producing vapor is saved. Additionally, due to the large surplus vapor, the system can respond flexibly to a change of required load of the fuel cells.

However, a sufficient surplus heat source is not available from the outside of the fuel cell system when the system is utilized as a power source for a vehicle. This is because there are few sources around the fuel cell system, which generate sufficient surplus heat. Accordingly, it is difficult to output a desired power, which is required to fuel cells, in a short time, when a driving condition of the vehicle is rapidly changed. Thus, response speed of actual output power of fuel cells against a change of required power, which is controlled by the speed at which hydrogen is supplied to the fuel cells, depends on the speed at which vapor can be supplied to a vapor reforming apparatus connected to the fuel cells.

SUMMARY OF THE INVENTION

Accordingly, it is an object of this invention to provide a hydrogen generator for fuel cells installed in a vehicle as a driving power source, which can readily supply a sufficient amount of hydrogen to fuel cells without an external heat source which generates surplus heat.

In order to achieve this and other objects, in accordance with one aspect of this invention, there is provided a hydrogen generator connected to a fuel cell installed in a vehicle as a driving power source. The hydrogen generator includes a reformer and a vaporizer. The reformer produces hydrogen from vapor and supplies the hydrogen to the fuel cell. The vaporizer produces a larger amount of vapor than is required to produce the requisite amount of hydrogen for the fuel cell to output a predetermined amount of energy.

Accordingly, it is possible to readily supply sufficient hydrogen to the fuel cell. Thus, the fuel cell can generate the required energy for driving the vehicle in a short time.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
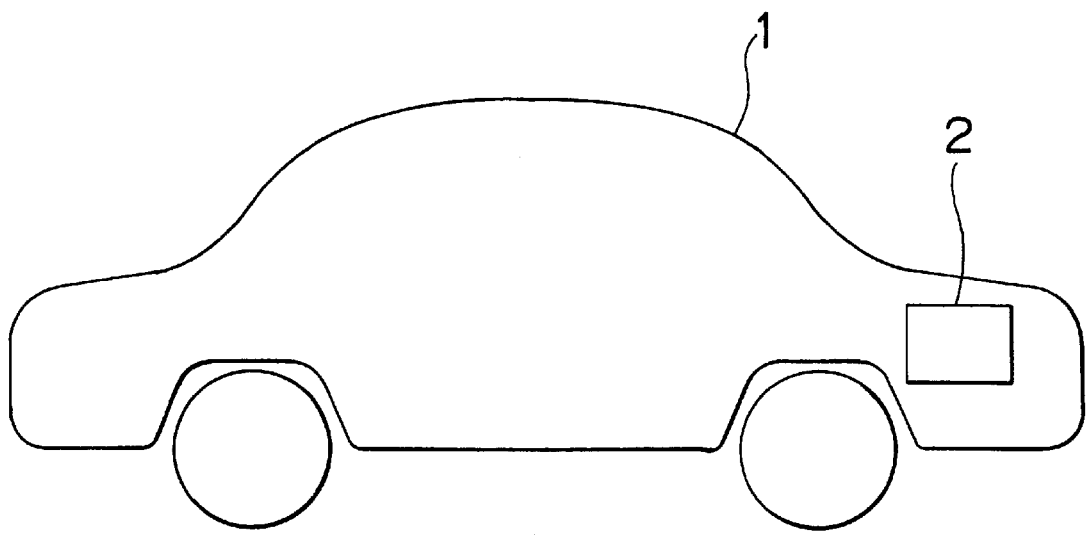
FIG. 1 is a schematic view of a fuel cell system installed in a vehicle.
Figure 2:
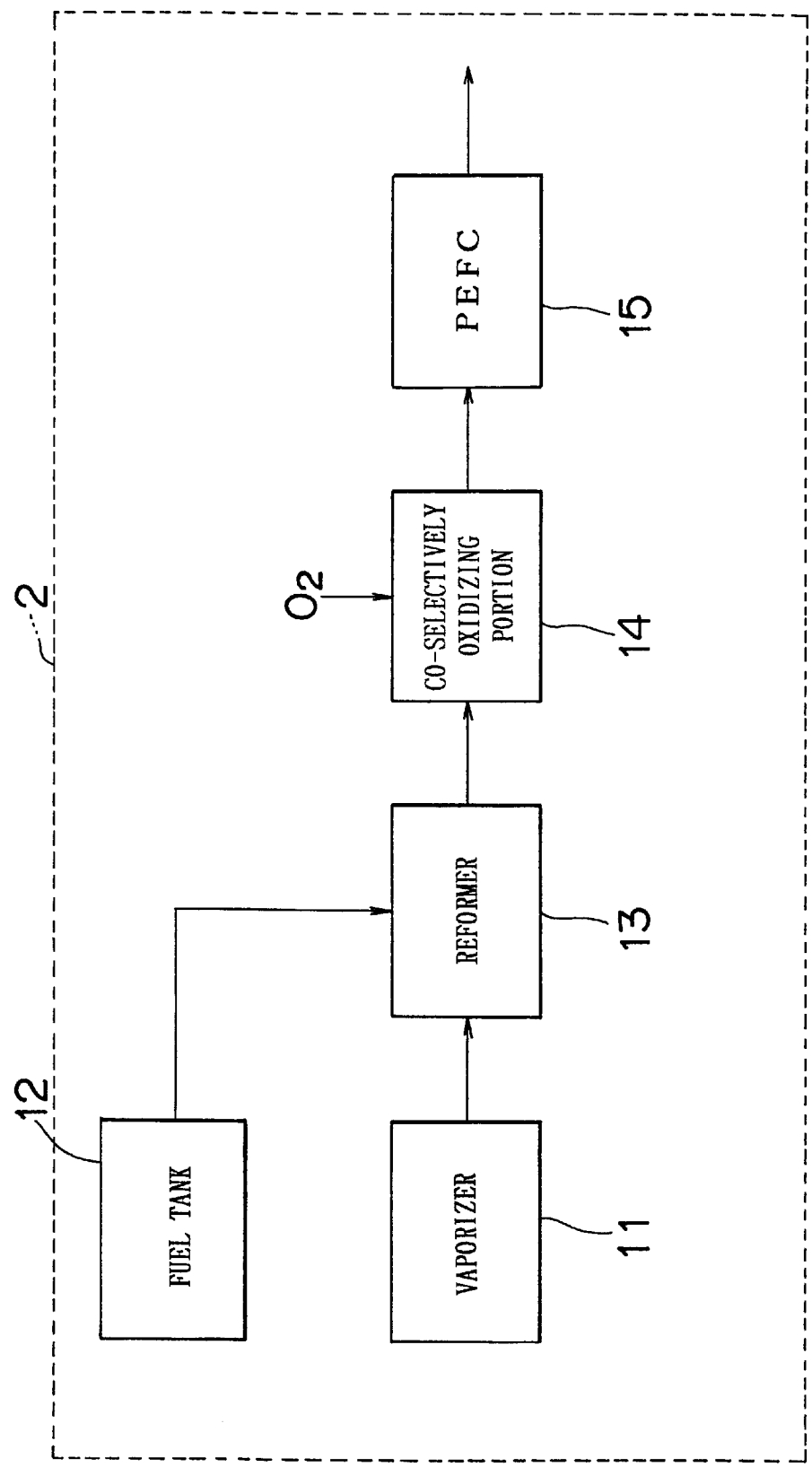
FIG. 2 is a block diagram of the fuel cell system.

FIG. 1 is a schematic view of a fuel cell system 2 installed in a vehicle 1. The vehicle can be an automobile, as illustrated in FIG. 1, or other vehicles such as, for example, a truck, a bus, a train, a boat or a ship, etc. FIG. 2 is a block diagram of the fuel cell system 2.

The fuel cell system 2 includes a vaporizer 11, a fuel tank 12, a reformer 13, a carbon monoxide selective oxidizing portion (CO-selective oxidizing portion) 14 and a polymer electrolyte fuel cell (PEFC) 15. Hereinafter, the term "hydrogen generator" refers to the aggregate of the vaporizer 11, the fuel tank 12, the reformer 13 and the CO-selective oxidizing portion 14.

The vaporizer 11 produces vapor from water. The fuel tank 12 stores a hydrocarbon such as, for example, methanol or methane, as a raw material. The fuel (the raw material) from the fuel tank 12 and the vapor produced by the vaporizer 11 are introduced into the reformer 13. In the reformer 13, the introduced gas is reformed into hydrogen-rich gas, which mostly is hydrogen ($H_2$), the remainder being a mixture of carbon monoxide (CO), carbon dioxide ($CO_2$), etc., by a catalyst in the reformer 13. Next, the hydrogen-rich gas is transferred to the CO-selective oxidizing portion 14 where carbon monoxide in the hydrogen-rich gas, which is an undesirable substance for PEFC 15, is selectively oxidized into carbon dioxide so that the concentration of the carbon monoxide is reduced to a suitable level, such as, for example, a ppm level in the tens or hundreds. Thus, the hydrogen-rich gas in which the carbon monoxide concentration has been reduced is introduced into PEFC 15 where electrical energy is released by a reaction of the hydrogen-rich gas and oxygen with electrodes as described earlier.

Figure 3:
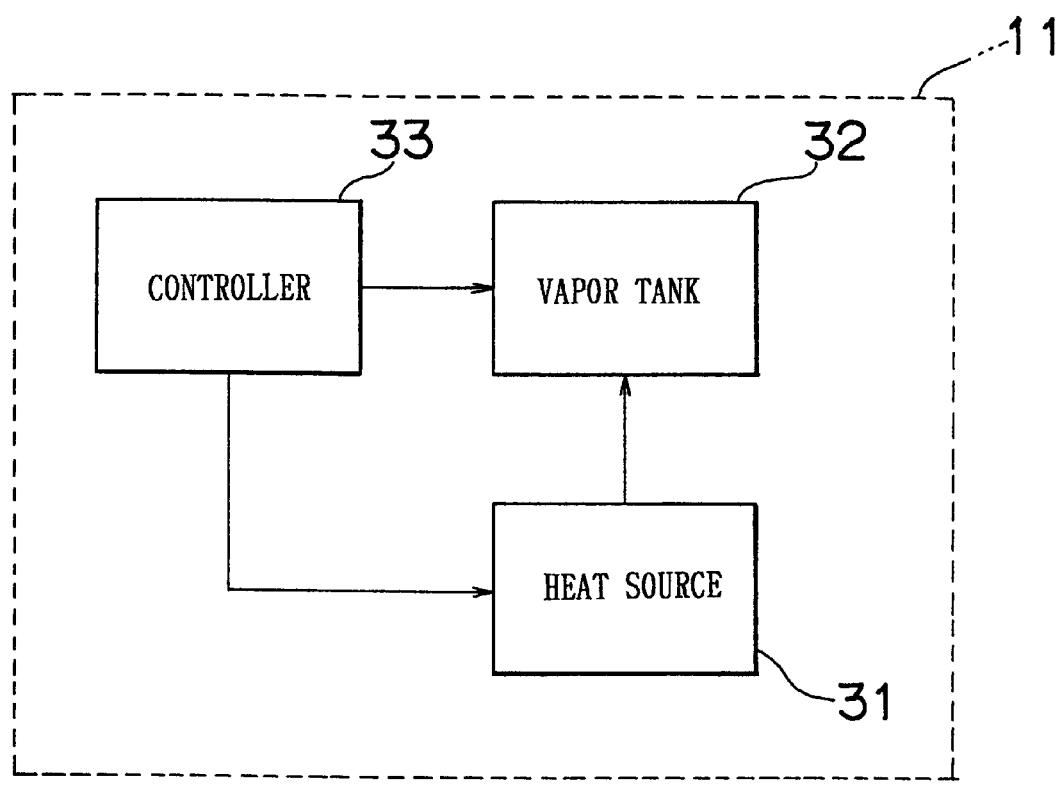
FIG. 3 is a block diagram of a vaporizer.

FIG. 3 is a diagram of the vaporizer 11. The vaporizer 11 includes a heat source 31, a vapor tank 32 where water is evaporated using heat generated in the heat source 31, and a controller 33. The controller 33 controls at least the heat source 31 so that the produced vapor amount becomes greater than the required amount corresponding to the required power of PEFC 15 when vehicle 1 is driving under normal driving condition.

The above described normal driving condition corresponds to the case when the fuel cell system 2 is driven with a load of one-third with respect to the maximum load. For example, when the vehicle 1 is an automobile, the normal driving condition means a condition when the automobile is driving in a town area, and the maximum load corresponds to the case when the vehicle is driving on an uphill road with a high speed such as 100 km/h. Thus, a vapor amount of $3 \times S_1$ [mol] will be required to generate a required amount of electrical power when the fuel cell system 2 is driven with a maximum load, if a required vapor amount under normal conditions is $S_1$ [mol]. The maximum vapor amount produced by vapor tank 32 corresponds to the required vapor amount when the fuel cell system 2 is driven with the maximum load.

Accordingly, it is preferable that the controller 33 controls the heat source 31 so that the vapor tank 32 can ordinarily produce vapor having a range of about 100% to about 300% of a required vapor amount to produce hydrogen sufficient to cause the electrochemical reaction to generate a required electrical power for driving the vehicle 1 under normal conditions. It has been found that the vapor amount can be readily increased from the 100% level to the 300% level without a substantial delay. Thus, the system can respond flexibly to sudden increases in the requisite power.

The heat source 31 can be structured so as to burn a fuel, such as methanol stored in the fuel tank 12, and/or hydrogen gas. It is preferable to use unreacted hydrogen gas which has been passed through the PEFC 15 as the fuel for the heat source 31.

Additionally, CO-selective oxidizing portion 14 can be added to the above components and also can be substituted for the heat source 31. When the CO-selective oxidizing portion 14 is used as the heat source 31, it may not be necessary to provide any additional component to heat the vapor tank 32 to produce vapor. Also, by utilizing waste heat from the CO-selective oxidizing portion 14, energy in the system can be used effectively.

When using the CO-selective oxidizing portion 14 as the heat source 31, the controller 33 can control a generation of heat in the CO-selective oxidizing portion 14 by changing a concentration of oxygen therein. As the concentration of the oxygen becomes higher, the heat generated in the CO-selective oxidizing portion 14 becomes greater.

Also, the controller 33 can control the amount of heat generated by the CO-selective oxidizing portion 14 by changing a concentration of carbon monoxide therein. As the concentration of the carbon monoxide becomes higher, the amount of heat generated by the CO-selective oxidizing portion 14 becomes greater. One of the methods to change the concentration of the carbon monoxide is by changing a vapor amount supplied from the reformer 13. As the concentration of carbon monoxide in the gas generated in the reformer 13 is decreased, the amount of vapor is increased.

The hydrogen generating device of this embodiment can produce more vapor than is required to produce hydrogen in sufficient amounts to generate a required electrical energy under the normal driving condition of the vehicle 1.

Thus, it is possible to accelerate the vehicle quickly by electrical energy generated in the PEFC 15, when the driving condition of the vehicle 1 shifts from the normal condition to another condition where vehicle I is required to accelerate rapidly. This is because the vaporizer 11 can produce a sufficient amount of vapor to the reformer 13, which corresponds to a required hydrogen amount for generating a required electrical energy in PEFC 15 to accelerate the vehicle 1.

A vaporizer of a second embodiment of this invention, where a CO-selective oxidizing portion is utilized as a heat source, will be described with reference to FIG. 4.

Figure 4:
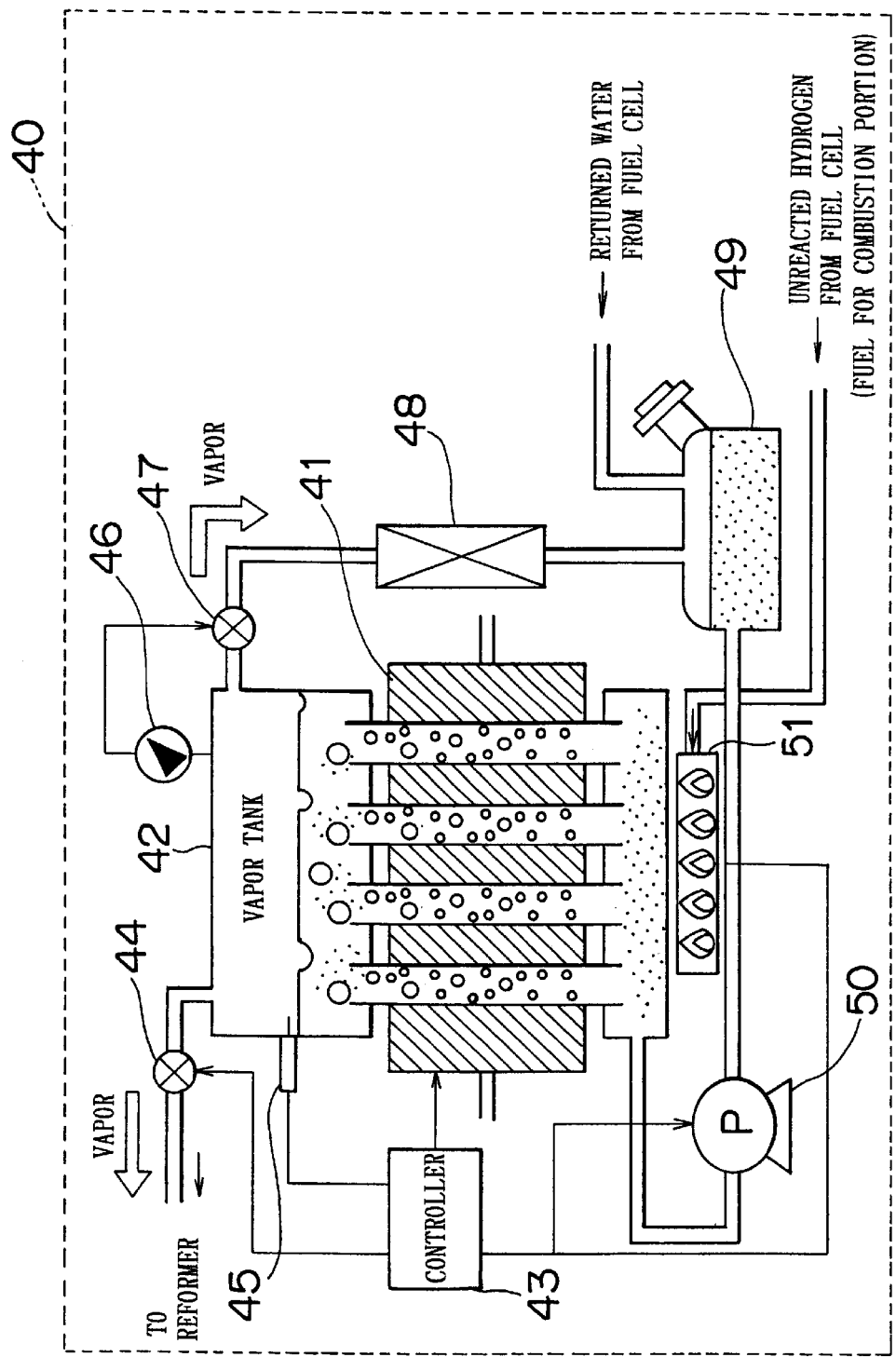
FIG. 4 is a schematic diagram of a vaporizer with a CO-selective oxidizing portion and a vapor tank.

FIG. 4 is a schematic diagram of a vaporizer 40 of the second embodiment of this invention. The vaporizer 40 includes a CO-selective oxidizing portion 41, a vapor tank 42, a controller 43, a valve 44, a water sensor 45, a pressure sensor 46, a pressure a control valve 47, a water condenser 48, a water tank 49, a water pump 50 and combustion portion 51.

A gas containing hydrogen, carbon monoxide and carbon dioxide, which is generated in a reformer (not shown in FIG. 4) is caused to pass through the CO-selective oxidizing portion 41 so that the carbon monoxide contained in the gas is oxidized selectively. The CO-selective oxidizing portion 41 generates heat when carbon monoxide is oxidized. As a catalyst in the CO-selective oxidizing portion 41, platinum-ruthenium alloy is used, for example.

The vapor tank 42 evaporates water using heat generated by the CO-selective oxidizing portion 41 and/or heat obtained from the combustion portion 51 where an unreacted hydrogen gas in a fuel cell is burned. As a result, the vapor tank 42 produces vapor.

The controller 43 controls at least one of the CO-selective oxidizing portion 41 and the combustion portion 51 so that the generated vapor amount becomes greater than the required amount corresponding to the required power of PEFC 15 when vehicle 1 is driving under normal driving conditions.

In detail, the controller 43 controls at least one of the CO-selective oxidizing portion 41 and the combustion portion 51 so that the vapor tank 42 can ordinarily produce vapor having a range of about 100% to about 300% of a required vapor amount for producing hydrogen utilized in the electrochemical reaction to generate a required electrical power to drive the vehicle 1 under normal driving conditions. The maximum vapor amount produced by vapor tank 42 corresponds to the required vapor amount when the PEFC 15 is driven with a maximum load.

As mentioned above, the controller 43 can control heat capacity generated from the CO-selective portion 41 by changing a vapor amount, a concentration of carbon monoxide or a concentration of oxygen therein. For example, the controller 43 controls the valve 44 so that a desired vapor amount is supplied to the reformer 13. The concentration of carbon monoxide in the gas produced in the reformer changes in accordance with the vapor amount which is supplied to the reformer.

The controller 43 detects a signal from the water sensor 45, which detects the water position in the vapor tank 42, and controls the water pump 50. When the water position is lower than a desired level, the controller 43 controls the water pump 50 so that water in the water tank 49 is introduced into the vapor tank 42. As a result, the position of the water in the vapor tank 42 is maintained and the CO-selective oxidizing portion 41 is uniformly cooled by the water in the water tank. This is done because it is desirable to maintain the temperature of the catalyst disposed in the CO-selective oxidizing portion 41 at a certain temperature. If the temperature is higher than the certain temperature, selective oxidizing of carbon monoxide is hardly executed. Namely, if the CO-selective oxidizing portion 41 is not uniformly cooled, the temperature of the catalyst becomes out of a desired range. Thus, the concentration of carbon monoxide is hardly reduced as low as a ppm level in the tens to hundreds.

The pressure sensor 46 detects an inner pressure of the vapor tank 42, which is used to control the pressure control valve 47 so that the inner pressure of the vapor tank 42 becomes a desired pressure. According to the pressure control, the water temperature in the vapor tank 42 is maintained at the boiling point depending on the inner pressure. For example, the inner pressure is controlled so that the boiling point of the water becomes about 140° C. To maintain the water at such a temperature means that the water temperature to cool the CO-selective oxidizing portion 41 is maintained constant.

The vapor discharged from the vapor tank 42 via the pressure control valve 47 is introduced into the water condenser 48 where the vapor becomes water. The water produced by the water condenser 48 is stored in the water tank 49. The water tank 49 also stores returned water which is discharged from PEFC 15.

The hydrogen generating device of this embodiment can produce more vapor than is required to produce hydrogen in an amount sufficient to generate a required electrical energy under normal driving conditions of the vehicle 1.

Thus, it is possible to accelerate the vehicle quickly by electrical energy generated in the PEFC 15, when the driving condition of the vehicle 1 shifts from the normal condition to another condition where vehicle 1 is required to accelerate rapidly. This is possible because the vaporizer 40 can produce a sufficient amount of vapor to the reformer 13, which corresponds to a required hydrogen amount for generating a required electrical energy in PEFC 15 to accelerate the vehicle 1.

According to the hydrogen generator of this invention, sufficient electrical energy can be readily supplied to the vehicle.

In the illustrated embodiment, the controller (33 or 43) can be implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the described control processes can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and combinations, which are exemplary, other combinations and configurations, including more, less or only a single element, are also within the spirit and scope of the invention.

What is claimed is:

1. A hydrogen generator that is part of a fuel cell system that includes the hydrogen generator and a fuel cell installed in a vehicle as a driving power source, the hydrogen generator comprising:

a reformer that produces a hydrogen-rich gas from vapor and fuel, and supplies the hydrogen-rich gas to the fuel cell; and a vaporizer that produces the vapor for the reformer in an amount greater than an amount required by the reformer to produce enough of the hydrogen-rich gas for the fuel cell to produce a predetermined amount of energy.

2. A hydrogen generator according to claim 1, wherein the amount of the vapor produced by the vaporizer is between greater than 100% and about 300% of the amount required by the reformer to produce enough of the hydrogen-rich gas for the fuel cell to produce the predetermined amount of energy.

3. A hydrogen generator according to claim 1, wherein the amount of the vapor produced by the vaporizer when the vehicle is driven at less than a maximum load is equal to an amount of vapor required by the reformer to produce enough of the hydrogen-rich gas for the fuel cell to power the vehicle driven with the maximum load.

4. A hydrogen generator according to claim 1, wherein the vaporizer comprises:

a heat source that generates heat;

a vapor tank that produces vapor from water by utilizing the heat; and a controller that controls an amount of the heat that is generated, and thus a vapor amount produced by the vaporizer.

5. A hydrogen generator according to claim 4, wherein the heat source is a carbon monoxide selective oxidizer.

6. A hydrogen generator according to claim 5, wherein the controller controls an amount of carbon monoxide supplied to the carbon monoxide selective oxidizer.

7. A hydrogen generator according to claim 5, wherein the controller controls an amount of oxygen supplied to the carbon monoxide selective oxidizer.

8. A hydrogen generator according to claim 5, wherein the controller controls an amount of vapor introduced into the reformer.

9. A hydrogen generator according to claim 4, wherein the heat source generates heat by burning fuel.

10. A hydrogen generator according to claim 4, wherein the controller controls a water pump that supplies water to the vapor tank, and controls a pressure valve that adjusts a pressure of the vapor tank.

11. A hydrogen generator according to claim 1, wherein the vehicle is an automobile.

12. A method for controlling a hydrogen generator that is part of a fuel cell system that includes the hydrogen generator and a fuel cell installed in a vehicle as a driving power source, the hydrogen generator producing a hydrogen-rich gas from vapor and fuel, and supplying the produced hydrogen-rich gas to the fuel cell, the method comprising:

producing an amount of the vapor in a vaporizer in an amount greater than an amount required for the reformer to produce enough of the hydrogen-rich gas for the fuel cell to produce a predetermined amount of energy; and reforming the vapor and the fuel into the hydrogen-rich gas in the reformer.

13. A method according to claim 12, wherein the amount of the vapor produced by the vaporizer is between greater than 100% and about 300% of the amount required to produce enough of the hydrogen-rich gas for the fuel cell to produce the predetermined amount of energy.

14. A method according to claim 12, wherein the amount of the vapor produced by the vaporizer when the vehicle is driven at less than a maximum load is equal to an amount of vapor required to provide enough of the hydrogen-rich gas for the fuel cell to power the vehicle driven with the maximum load.

15. A method according to claim 12 further comprising: controlling a heat amount generated by a heat source of the vaporizer.

16. A method according to claim 15, wherein the heat source is a carbon monoxide selective oxidizer.

17. A method according to claim 16, wherein an amount of carbon monoxide supplied to the carbon monoxide selective oxidizer is controlled in order to control the heat amount.

18. A method according to claim 16, wherein an amount of oxygen supplied to the carbon dioxide selective oxidizer is controlled in order to control the heat amount.

19. A method according to claim 16, wherein an amount of the vapor introduced into the reformer is controlled in order to control the heat amount.

20. A method according to claim 15, wherein the heat source generates heat by burning fuel.

* * * * *